Sept. 28, 1965    G. KAISER ET AL    3,208,101
APPARATUS FOR THE PRODUCTION OF PELLETS FROM A MELT
Filed Dec. 26, 1962    3 Sheets-Sheet 2

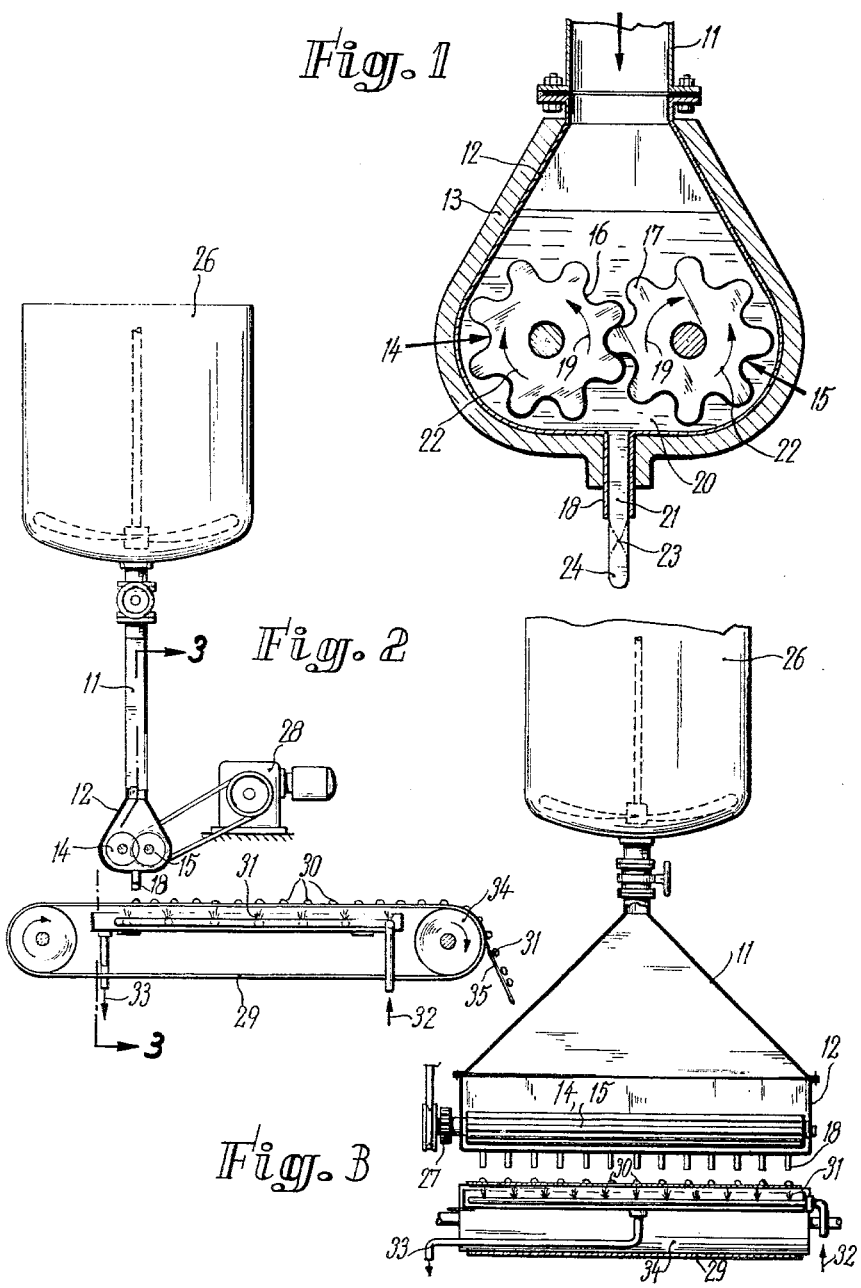

INVENTORS
GUNTER KAISER
HERBERT KAISER
By
OSTROLENK, FABER, GERB & SOFFEN
ATTORNEYS

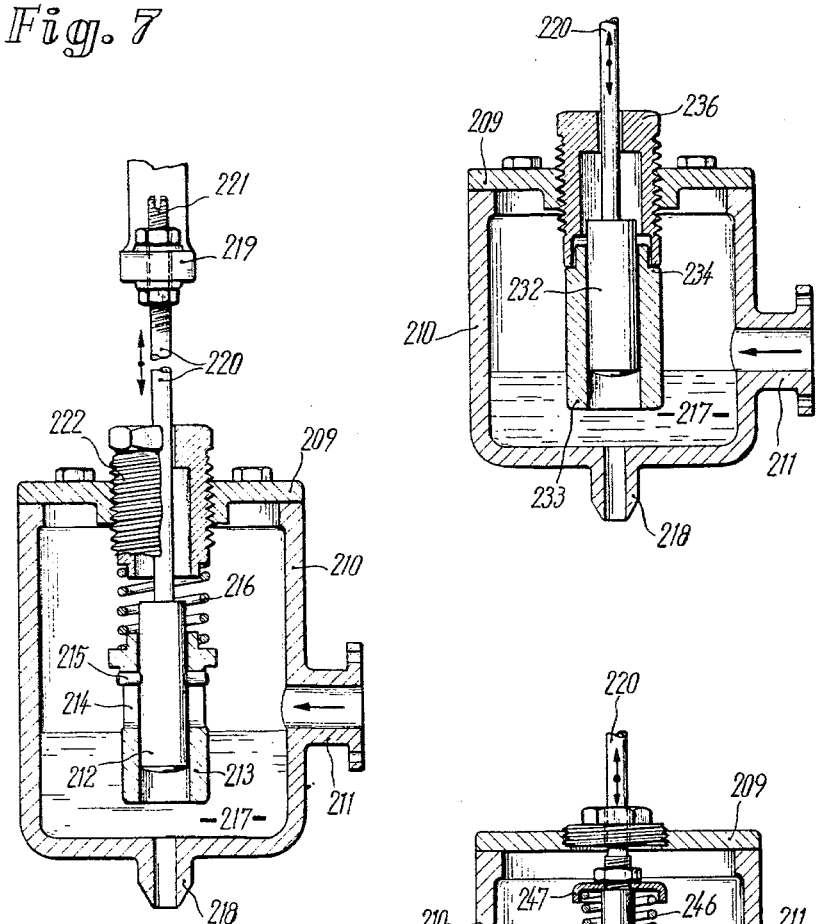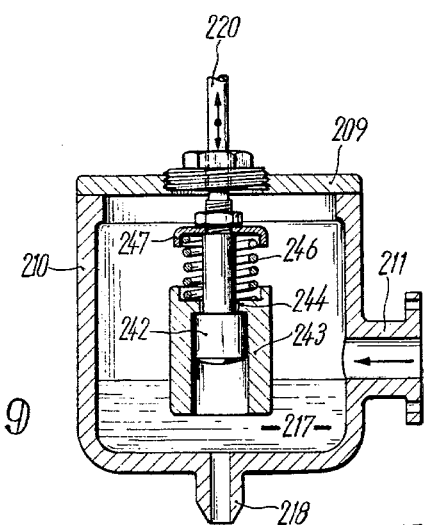

United States Patent Office 3,208,101
Patented Sept. 28, 1965

3,208,101
APPARATUS FOR THE PRODUCTION OF
PELLETS FROM A MELT
Günter Kaiser, Westerburgstr. 34, Krefeld-Uerdingen,
Germany, and Herbert Kaiser, Jentgesallee 24, Krefeld,
Germany
Filed Dec. 26, 1962, Ser. No. 247,182
Claims priority, application Germany, Jan. 3, 1962,
M 47,406; July 26, 1962, M 51,361
8 Claims. (Cl. 18—2.4)

This invention relates to an apparatus for the continuous production of pellets from a melt. The apparatus according to the invention comprises a tank containing molten material and having a bottom formed with one or more outlet openings. According to the invention, this tank is arranged so that a reversible pump is disposed before the openings, which pump is operable to produce subatmospheric and superatmospheric pressures before the openings in a controlled alternation.

In a preferred embodiment of the apparatus according to the invention, a bell which can be lifted and lowered is disposed over each opening and in its lowered condition encloses a certain volume of molten material adjacent to the opening, and a ram which can be lifted and lowered is disposed in the bell and enables a variation of the volume enclosed by the bell.

Further advantages and details of the invention will become apparent form the following description of the illustrative embodiments shown in the accompanying drawings, in which:

FIG. 1 is an axial transverse sectional view showing an apparatus according to the invention for producing super- and subatmospheric pressures before an opening on a scale larger than that of FIGS. 2 and 3.

FIG. 2 is a diagrammatic illustration of the apparatus and process according to the invention.

FIG. 3 is a sectional view taken on line 3—3 of FIG. 2.

FIGS. 7 to 9 are transverse sectional views showing three further embodiments of the apparatus according to the invention.

Figure 4:
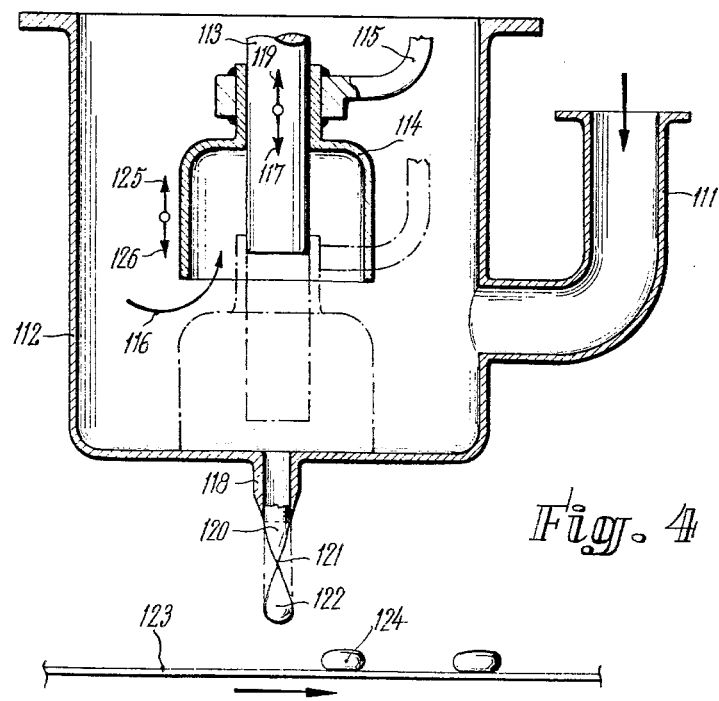
FIG. 4 is an axial transverse sectional view showing another embodiment of the apparatus according to the invention for producing super- and subatmospheric pressures before an opening on a scale larger than that of FIGS. 5 and 6.

According to FIG. 1, molten material is fed through the pipeline 11 into the tank 12, which is provided with a jacket 13 for heating. The tank contains two rolls 14 and 15 having a gearlike cross-section. The elevations 17 and depressions 16 of the rolls are rounded and shaped so that the rolls, which are disposed in an appropriate relation, cooperate in the manner of a gear pump. The shafts of the rolls terminate outside the tank and have two gears meshing with each other secured to them so that an elevation 17 of one roll enters a depression 16 of the opposite roll. One or more dies 18 are inserted in the bottom of the tank 12. A rotation of the rolls in the direction of the arrows 19 in mutually opposite senses causes the molten material to flow on the outside of the rolls into the pressure space 20. The resulting superatmospheric pressure causes the molten material to be extruded in the form of extrusions 21 from the dies 18. As soon as a certain length of extrusion protrudes from the die, the two rolls are reversed by a suitable drive to move in the opposite direction of rotation (arrow 22) so that the emerging extrusions are braked and constricted as indicated at 23. The volume 24 disposed below the constriction tears off under the action of gravity and of its kinetic energy and drops on the cooled collecting surface. The extrusion 21 with its filamentous end portion is sucked back into the die 18.

It is apparent that the two rolls 14 and 15 perform a progressive reciprocating angular motion by rotating, e.g., through a predetermined angle in the direction of the arrows 19 to apply pressure to the molten material in the space 20, whereafter they are rotated in the reverse direction, in the direction of arrows 22, e.g., by half the above angle, to retract the extrusion 21 of molten material into the die. This progressive reciprocating angular motion of the pair of rolls is preferably effected by a controlled reversing transmission or may be controlled by electrical circuits. The amount of the volume 24 of molten material to be extruded is determined, inter alia, by the number of grooves formed on the rolls. The total cross-sectional area of the die orifices must be so related to the discharge rate of the two rolls that the superatmospheric pressure produced at 20 is sufficient to ensure that the molten material will spontaneously emerge from the dies 18. This emergence will depend on the viscosity of the product.

Instead of the grooved rolls, other elements may be used for producing the superatmospheric and subatmospheric pressure. Such other elements may consist, e.g., of eccentrically mounted cylinders provided with sliding members, oscillating plates, rotary pistons having helical grooves, or of small feed screws which are inserted in the die tubes and rotate alternatingly in the left-hand and right-hand direction, etc., because the only requirement which must be met resides in that superatmospheric and subatmospheric pressures are produced before the die inlet, e.g., at 20, in rapid alternation.

According to FIGS. 2 and 3 the molten material is contained in a heated container 26, in which it is made or merely buffered and from which it flows through a connecting conduit 11 to the tank 12, in which the elements for producing super- and subatmospheric pressures, e.g., the rolls 14 and 15 of FIG. 1 are disposed, which are caused to rotate in mutually opposite directions by a pair of gears 27 driven by the controlled reversing transmission 28. The volume 24 which emerges from the die 18 and is constricted drops on a revolving endless steel belt 29, on which it solidifies together with the other pellets 30 from the other dies. A cooling liquid supplied at 32 and drained at 33 is sprayed by nozzles 31 against the underside of the belt 29. As the belt is reversed around the roller 34, the solidified pellets are removed from the belt by the scraper 35.

Figure 5:
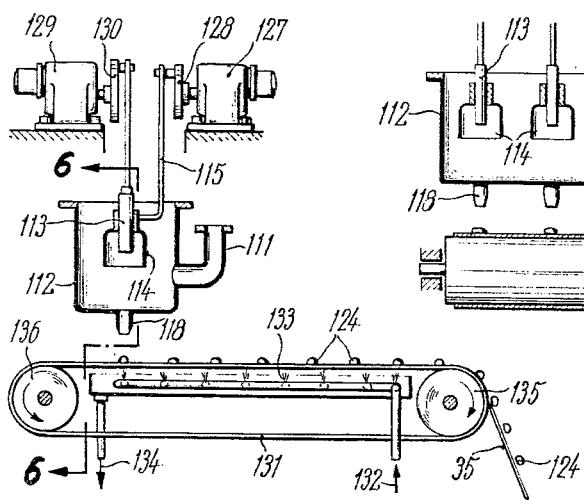
FIG. 5 is a diagrammatic illustration of the modified embodiment of the apparatus and process according to the invention.
Figure 6:
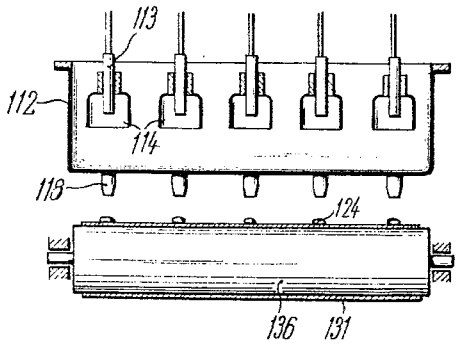
FIG. 6 is a sectional view taken on line 6—6 in FIG. 5.

In the second embodiment shown in FIGS. 4 to 6, the molten material flows through a pipeline 111 into the tank 112 provided with suitable heating means. The tank contains a ram 113, to which an up and down motion can be imparted by means of an adjustable eccentric 130. A bell having open top and bottom ends is slidably mounted on the ram 113 and is connected by a linkage 115 to a separate eccentric 128, the eccentricity of which is also adjustable.

In the position shown in solid lines, the ram and bell are at their upper dead centers so that the molten material can flow in the direction of arrow 116 below the bell. The bell 114 is then caused by its eccentric drive to be lowered in the direction of arrow 126 to the bottom of the tank containing the molten material whereby the volume of molten material enclosed by the bell is sealed from the remaining molten material in the tank.

The ram 113 is then also lowered in the direction of arrow 117 to apply pressure to the volume of molten material under the bell 114 and causes molten material to be extruded from the die 118. The lower position of the ram and bell is shown in dash-and-dot lines. The return movement of the ram in the direction of arrow 119 causes the liquid jet 120 to be constricted and torn off at 121 so that the volume 122 of molten material drops on the collecting surface 123, where it is cooled to solidify in the form of a solid pellet 124.

When the liquid jet was being constricted at 121, i.e., immediately after the beginning of the movement of the ram in the direction of the arrow 119, the bell 114 lifts in the direction of arrow 125 and the molten material in the tank flows again in the direction of the arrow 116 below the bell, which is then moved upwardly to its upper dead center.

According to FIGS. 5 and 6, the tank contains a plurality of bells 114, which can be moved up and down by a transmission 127 through the intermediary of the eccentric 128 and the linkage 115. The ram 113 is moved up and down by the transmission 129 through the intermediary of the eccentric 130. As described hereinbefore, the pellet volume emerges from the die 118 and is collected, e.g., on a steel belt 131, whereas it is cooled to solidify as a solid pellet 124. The cooling liquid is supplied at 132 and is directed at 133 against the underside of the steel belt and then drained at 134. The steel belt 131 revolves continuously or periodically around the two pulleys 135 and 136.

FIG. 6 shows again the arrangement of a plurality of bells 114 and rams 113 one beside the other in the tank 112.

In the further embodiment shown in FIG. 7, the tank 210 is filled with the molten material 217 to a desired level and is formed in its bottom with an opening 218, through which the molten material is periodically extruded. The top of the tank containing the molten material is closed by a cover 209, through which a bushing 222 extends, in which a vertical piston rod 220 is slidable. The piston rod is moved up and down, e.g., by a transmission through the intermediary of a suitable eccentric drive.

The piston rod 220 has secured to its lower end the piston 212, which is slidable in the bell 213. A helical compression spring 216 extends between the lower end of the bushing 222 and the upper end of the bell 213 and provides for a mechanical initial stress between the tank and the bell 213, which is thus constantly subjected to a downwardly directed force, which causes the bell to descend to the bottom of the tank and seal the opening 218 unless this movement is prevented by an opposing force.

Such an opposing force may be transmitted to the bell 213 by the piston 212 because the bell has diametrically opposite, vertical slots 314 which cooperate with a transverse pin 215 extending through the piston 212.

When the piston 212 is raised by the piston rod 220, the pin 215 will soon engage the top end of the slots 214 so that the bell is raised together with the piston 212 against the force of spring 216.

During a descent of the piston 212, it will be followed by the bell 213 under the action of the spring 216 until the bell engages the bottom of the tank 210. A further descent of the piston 212 will cause the pin 215 to enter the slot 214 and will cause a portion of the volume of molten material separated by the bell to be extruded through the opening 218.

When the piston movement has been reversed, the bell 213 will seal the enclosed volume until the pin 215 re-engages the top end of the slots 214. During this phase, the separated volume is subjected to a considerable negative pressure, which causes the extrusion of molten material to tear off. New molten material enters through the feed pipe 211 when the bell 213 has been lifted.

The bushing 222 is preferably threaded into the thicker part of the cover 209 to enable an adjustment of the stress of spring 216 within certain limits.

The eccentric drive acts on the lifting beam 219, which is held by two nuts 221 in threaded engagement with the threaded end portion of the piston rod 220. The mean height of the piston 212 can be varied by an adjustment of the nuts 221.

FIG. 8 shows a simplified embodiment, in which the helical spring is eliminated. The bell 233 is lowered by gravity and by the force applied by the piston 232 to the viscous molten material and transmitted to the bell 233 by friction. The floating bell 233 will also follow the upward movement of the piston 232, the force being transmitted only loosely by the molten material rather than by stops or the like. The upward movement of the bell 233 will be terminated when stops 234 of the bell engage the adjustable bushing 236.

FIG. 9 shows another embodiment, in which the upper end of the helical spring 246 bears on a flange 247 secured to the piston rod 220. In this case, the piston 242 does not have a transverse pin but the piston itself engages stops 244 of the bell 243.

The apparatus shown in FIGS. 7 to 9 has the advantage that a single eccentric drive is sufficient to effect the desired up and down movement of the piston 212, 232, 242 and of the bell 213, 233, 243.

What is claimed is:
1. An apparatus for pelletizing a molten material which comprises:
   (a) a tank for receiving the molten material, said tank including a bottom portion provided with at least one die through which the material is to be extruded for pellet formation therefrom;
   (b) intermittently operable pressure-applying means disposed within said tank closely spaced from said die for successively subjecting the molten material in the tank adjacent the die to superatmospheric pressure to effect extrusion of the molten material through said die, and to subatmospheric pressure to constrict the extruded molten material and facilitate gravity separation of a portion of the extruded material at said constriction, said pressure applying means comprising a reciprocably movable bell disposed above said die, a reciprocably movable piston slidably supported within a barrel formed in said bell, and drive means for intermittently reciprocating the bell and the piston to successively impose the superatmospheric and subatmospheric pressures upon the molten material adjacent said die;
   (c) a collecting surface spaced from and disposed beneath said die for receiving the successive separated portions of the material extruded therefrom; and
   (d) means for cooling said collecting surface to facilitate fusion of the separated portions of molten material received thereby.

2. The apparatus as set forth in claim 1, including independently actuable drives for effecting reciprocal movement of each of said piston and said bell.

3. The apparatus as set forth in claim 1, including a plurality of said dies formed in said tank, each of said dies having one of the bells and one of the pistons associated therewith; a first drive mechanism including an eccentric coupled to the plurality of said bells; and a second drive mechanism including an eccentric coupled to the plurality of said pistons.

4. The apparatus as set forth in claim 1, including resilient means interposed between said tank and said bell urging the latter over said die, and means associated with said piston for moving the bell away from the die.

5. The apparatus as set forth in claim 1, in which said piston is spaced from the walls of the barrel defined within said bell by a distance such that the fluid friction between the respective members is sufficient to effect movement of said bell responsive to the corresponding movement of said piston.

6. The apparatus as set forth in claim 1, including resilient means between said piston and said bell urging the latter over said die, and means associated with the piston for moving the bell away from said die.

7. An apparatus for pelletizing a molten material, which comprises:
- (a) a tank for receiving the molten material, said tank including an apertured cover member carrying a bushing in threaded engagement therewith, and having at least one die formed in the base of said tank through which the material to be pelletized is extruded;
- (b) intermittently operable pressure applying means disposed within said tank closely spaced from said die for successively subjecting the molten material in the tank adjacent the die to superatmospheric and subatmospheric pressures to successively extrude the molten material through the die and constrict the extruded material, thereby facilitating gravity separation of a portion of the extruded material at said constriction, said means including:
    - (1) a reciprocably movable bell disposed above said die within the tank,
    - (2) reciprocably movable piston slidably supported within a hollow barrel defined lengthwise of said bell, said piston being spaced from the walls of the barrel by a distance such that the fluid friction between the respective members is sufficient to effect longitudinal movement of said bell responsive to the corresponding movement of said piston, and
    - (3) stop means limiting the movement of said bell with respect to said bushing;
- (c) a collecting surface spaced from and disposed beneath said die for receiving the successive separated portions of the material extruded therefrom; and
- (d) means for cooling said collecting surface to facilitate fushion of the separated portions of molten material received thereby.

8. The apparatus as set forth in claim 7, in which said collecting surface comprises a conveyor belt movable in a predetermined direction and in which a plurality of said dies are defined within the tank aligned in a direction at right angles to said predetermined direction for intermittently feeding a plurality of portions of the molten material on to said conveyor belt.

References Cited by the Examiner
UNITED STATES PATENTS

| | | | |
|---|---|---|---|
| 2,510,574 | 6/50 | Greenhalgh | 18—47.2 |
| 2,790,201 | 4/57 | Eilbracht et al. | 18—2.4 |
| 2,795,819 | 6/57 | Lezberg et al. | 18—2.4 |
| 2,887,724 | 5/59 | Bettes | 18—47.2 |
| 2,931,067 | 4/60 | Delaloye et al. | 18—2.7 |

WILLIAM J. STEPHENSON, *Primary Examiner.*

MORRIS LIEBMAN, MICHAEL V. BRINDISI,
*Examiners.*